(12) United States Patent
Stockton et al.

(10) Patent No.: US 12,162,217 B2
(45) Date of Patent: Dec. 10, 2024

(54) THREE-DIMENSIONAL PRINTER HEAD INCLUDING A DIELECTRIC BARRIER DISCHARGE (DBD) DISK AND A TRANSFORMER ASSEMBLY

(71) Applicant: Nexa3D Inc., Ventura, CA (US)

(72) Inventors: Alex Stockton, Austin, TX (US); Jason Greene, Huntington Beach, CA (US); Xingping Li, Irvine, CA (US)

(73) Assignee: Nexa3D Inc., Ventura, CA (US)

( * ) Notice: Subject to any disclaimer, the term of this patent is extended or adjusted under 35 U.S.C. 154(b) by 669 days.

(21) Appl. No.: 17/488,798

(22) Filed: Sep. 29, 2021

(65) Prior Publication Data
US 2023/0102328 A1 Mar. 30, 2023

(51) Int. Cl.
| | |
|---|---|
| *B29C 64/209* | (2017.01) |
| *B23K 10/02* | (2006.01) |
| *B29C 64/264* | (2017.01) |
| *B33Y 30/00* | (2015.01) |
| *H05H 1/24* | (2006.01) |

(52) U.S. Cl.
CPC .......... *B29C 64/209* (2017.08); *B23K 10/027* (2013.01); *B29C 64/264* (2017.08); *H05H 1/2418* (2021.05); *H05H 1/2437* (2021.05); *B33Y 30/00* (2014.12)

(58) Field of Classification Search
None
See application file for complete search history.

(56) References Cited

U.S. PATENT DOCUMENTS

| | | | | |
|---|---|---|---|---|
| 2009/0009090 | A1* | 1/2009 | Viol | H05H 1/2406 315/111.21 |
| 2010/0145253 | A1* | 6/2010 | Gutsol | A61N 1/40 606/49 |
| 2015/0216026 | A1* | 7/2015 | Wandke | H05H 1/2406 313/352 |
| 2016/0242269 | A1* | 8/2016 | Dirk | H05H 1/2406 |
| 2017/0127506 | A1* | 5/2017 | Ghomi Marzdashty | H05H 1/2406 |

(Continued)

FOREIGN PATENT DOCUMENTS

CN 106028615 A * 10/2016

OTHER PUBLICATIONS

CN 106028615 A (Fung, Zhi et al.) Oct. 12, 2016 [retrieved on Jul. 13, 2024]. Retrieved from Foreign Image and Text database, translation by Clarivate Analytics. (Year: 2016).*

*Primary Examiner* — John J Norton
(74) *Attorney, Agent, or Firm* — Ascenda Law Group, PC (57) ABSTRACT

A printer head for a three-dimensional printer includes a dielectric barrier discharge (DBD) disk configured to generate a plasma, where the DBD disk requires a high voltage alternating current (AC) voltage signal to generate the plasma. The printer head also includes a transformer assembly including a transformer and a housing that contains the transformer. The transformer is configured to transform an incoming AC voltage signal into the high voltage AC signal for the DBD disk. The printer head also includes an electrical wire that electrically connects the transformer to the DBD disk. The printer head also includes a wire guide defining a passageway, where a portion of the electrical wire is received by the passageway in the wire guide. The passageway of the wire guide is shaped to direct the electrical wire towards the DBD disk.

15 Claims, 7 Drawing Sheets

(56) References Cited

U.S. PATENT DOCUMENTS

2021/0213553 A1* 7/2021 Walker .................. B23K 9/173
2021/0401480 A1* 12/2021 Azoulay ................ A45D 29/00

* cited by examiner

THREE-DIMENSIONAL PRINTER HEAD INCLUDING A DIELECTRIC BARRIER DISCHARGE (DBD) DISK AND A TRANSFORMER ASSEMBLY

FIELD

The present disclosure is directed to a three-dimensional printer head that includes a dielectric barrier discharge (DBD) disk and a transformer assembly.

BACKGROUND

The statements in this section merely provide background information related to the present disclosure and may or may not constitute prior art.

Three-dimensional printing, which is also referred to as additive manufacturing, creates printed components based on computer models. In one example, a printed component may be created by depositing a feedstock, such as a thermoplastic filament, through a heated nozzle in successive layers upon a base plate. Additive manufacturing techniques may be used to create large, relatively complex components. However, since additive manufacturing techniques involve building parts layer by layer, the resulting printed components exhibit an anisotropic tensile strength. That is, the tensile strength measured in the build direction of the printed component may be significantly less when compared to the tensile strength measured in a direction perpendicular to the build direction.

In one approach to improve the tensile strength of a printed component in the build direction, electromagnetic energy may be used to fuse the successive layers of the printed component together. Specifically, a dielectric barrier discharge (DBD) electrode that generates plasma is included as part of the three-dimensional printer. The plasma provides a conductive pathway between a point of extrusion located below the nozzle and the printed component. The conductive pathway enables heating of the printed component, or at least portions of the printed component proximate to the point of extrusion. The heat welds successive layers of the printed component together, thereby improving the tensile strength in the build direction. The DBD plasma electrode requires a high voltage alternating current (AC) signal, which may range from about five to about ten kilovolts, to generate the plasma.

In one implementation, the high voltage required by the DBD plasma electrode is initially created by a control circuit as a lower voltage AC signal, which is then sent to a step-up flyback transformer. The flyback transformer then transforms the lower voltage AC signal from the control circuit into the high voltage AC signal. However, in many instances, the flyback transformer is positioned in a location within the three-dimensional printer that is relatively far from the printer head. As a result, relatively long electrical wiring may be needed to transmit the high voltage AC signal from the flyback transformer to the DBD plasma electrode. This may result in increased cost as well as signal loss.

Thus, while current DBD plasma electrodes used in additive manufacturing techniques achieve their intended purpose, there is a need for a relatively simple and compact circuit for generating and controlling the high voltage AC signal required by the DBD plasma electrode.

SUMMARY

According to several aspects, a printer head for a three-dimensional printer is disclosed. The printer head includes a dielectric barrier discharge (DBD) disk configured to generate a plasma. The DBD disk requires a high voltage alternating current (AC) voltage signal to generate the plasma. The printer head also includes a transformer assembly including a transformer and a housing that contains the transformer, where the transformer is configured to transform an incoming AC voltage signal into the high voltage AC signal for the DBD disk. The printer head further includes an electrical wire that electrically connects the transformer to the DBD disk. The printer head also includes a wire guide defining a passageway, where a portion of the electrical wire is received by the passageway in the wire guide. The passageway of the wire guide is shaped to direct the electrical wire towards the DBD disk.

In another aspect, a printer head for a three-dimensional printer is disclosed and includes a DBD disk configured to generate a plasma, where the DBD disk requires a high voltage AC signal to generate the plasma. The three-dimensional printer also includes a transformer assembly including a transformer and a housing that contains the transformer. The transformer is configured to transform an incoming AC voltage signal into the high voltage AC signal for the DBD disk. The printer also includes an electrical wire that electrically connects the transformer to the DBD disk. The printer further includes a wire guide defining a passageway, where a portion of the electrical wire is received by the passageway in the wire guide. The passageway of the wire guide is shaped to direct the electrical wire towards the DBD disk. The three-dimensional printer also includes a pan, wherein the wire guide is fixedly attached to the pan. Finally, the three-dimensional printer includes an upper plate that is positioned above the pan, where the transformer assembly is positioned between the upper plate and the pan.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
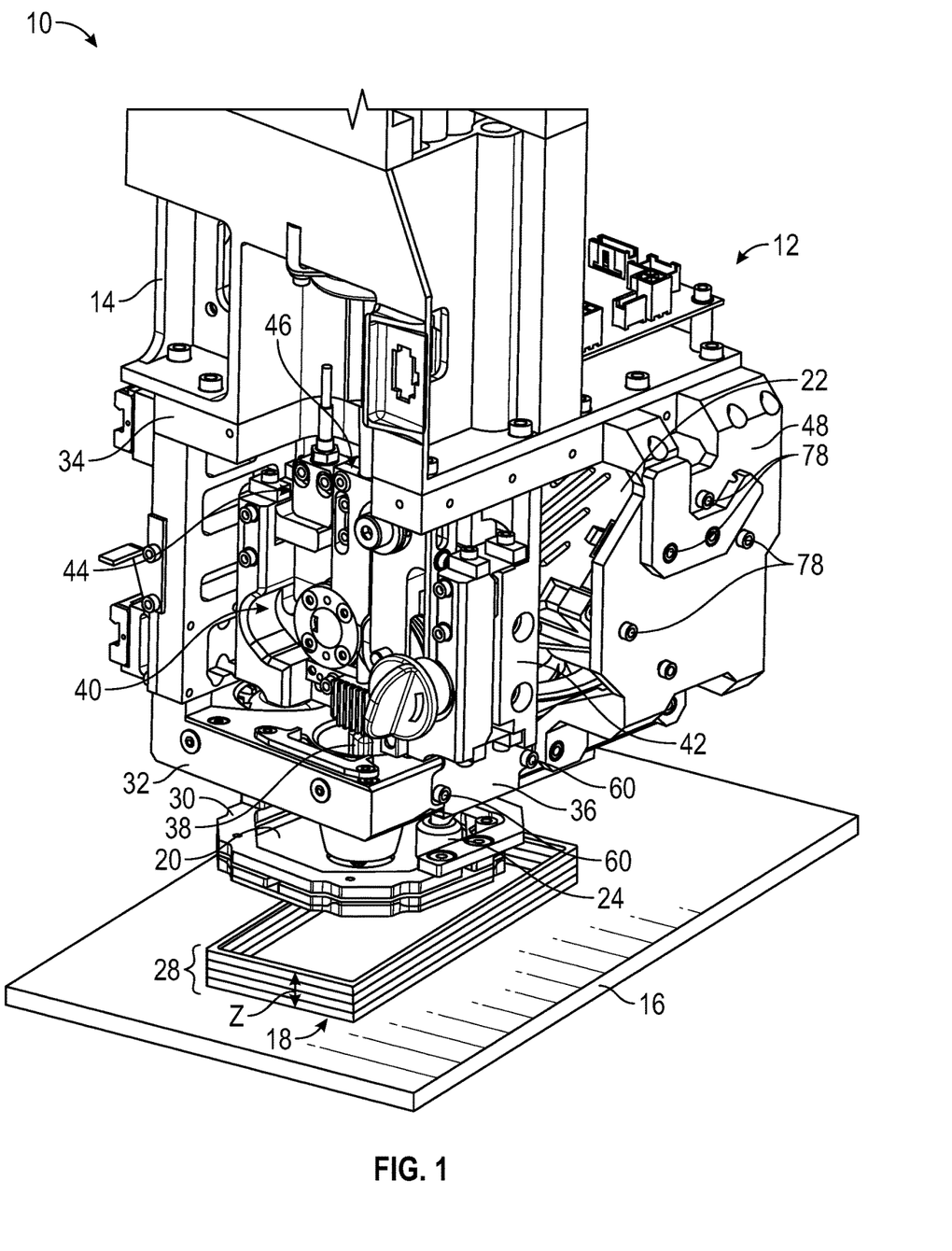
FIG. 1 is a perspective view of a printer head for a three-dimensional printer, where the printer head includes a transformer assembly that provides a high voltage AC signal to a dielectric barrier discharge (DBD) electrode, according to an exemplary embodiment.

The present disclosure is directed to a printer head including a dielectric barrier discharge (DBD) disk configured to generate a plasma and a transformer assembly that provides a high voltage AC signal required by the DBD disk, where the transformer assembly is part of the printer head. Referring now to FIG. 1, a perspective view of a portion of a three-dimensional printer 10 is shown including a printer head 12, a support structure 14, and a build substrate 16. The build substrate 16 provides support to a printed component 18 that the three-dimensional printer 10 creates. The printer head 12 of the three-dimensional printer 10 includes a DBD disk 20 electrically connected to a transformer assembly 22 by an electrical wire 24 (the electrical wire 24 is also shown more clearly in FIGS. 2-3). The DBD disk 20 is configured to generate plasma that that creates a conductive pathway that enables heating of the printed component 18. Specifically, the heat welds successive layers 28 of the printed component 18 together, thereby improving the tensile strength of the printed component 18 in a build direction Z.

The transformer assembly 22 provides a high voltage alternating current (AC) signal to the DBD disk 20. The high voltage AC signal is required by the DBD disk 20 in order to generate the plasma. Specifically, the transformer assembly 22 receives an incoming AC voltage signal from a source such as a control circuit (not shown in the figures) that is part of the three-dimensional printer 10. The incoming AC voltage signal is less than the high voltage AC signal. For example, the high voltage AC signal may range from about from about five to about ten kilovolts and the incoming AC voltage signal is about twenty four volts, however, it is to be appreciated that other values may be used as well. The transformer assembly 22 transfers the incoming AC voltage signal to the DBD disk as the high voltage AC signal via the electrical wire 24. It is to be appreciated that the control circuit that provides the transformer assembly 22 with the incoming AC voltage signal is not part of the printer head 12, and instead is located with the other control electronics for the three-dimensional printer 10 and is connected to the transformer assembly 22 by a cable that is relatively long. In embodiments, the cable may be about 1.8 meters (6 feet) in length. However, the transformer assembly 22 is part of the printer head 12.

Continuing to refer to FIG. 1, the printer head 12 also includes a mounting fixture 30, a pan 32, an upper plate 34, a wire guide 36, a heated nozzle 38, a feed system 40, a feed plate 42, a sensor assembly 44, a receiver assembly 46, and an outer bracket 48. The mounting fixture 30 attaches the DBD disk 20 to the pan 32 of the printer head 12. The upper plate 34 connects the printer head 12 to the support structure 14. The printer head 12 creates the printed component 18 by heating a filament (not shown) and depositing the heated filament onto either the build substrate 16 or the printed component 18. Specifically, the receiver assembly 46 of the printer head 12 first receives the filament from a filament source. The filament is guided through the receiver assembly 46 and towards the feed system 40 of the printer head 12. The feed system 24 pulls or advances the filament through the printer head 12 and towards the heated nozzle 38. The heated nozzle 38 heats the filament, and the filament exits the printer head 12 through a discharge opening (not shown) of the heated nozzle 38 and onto either the build substrate 16 or the printed component 18.

Figure 2:
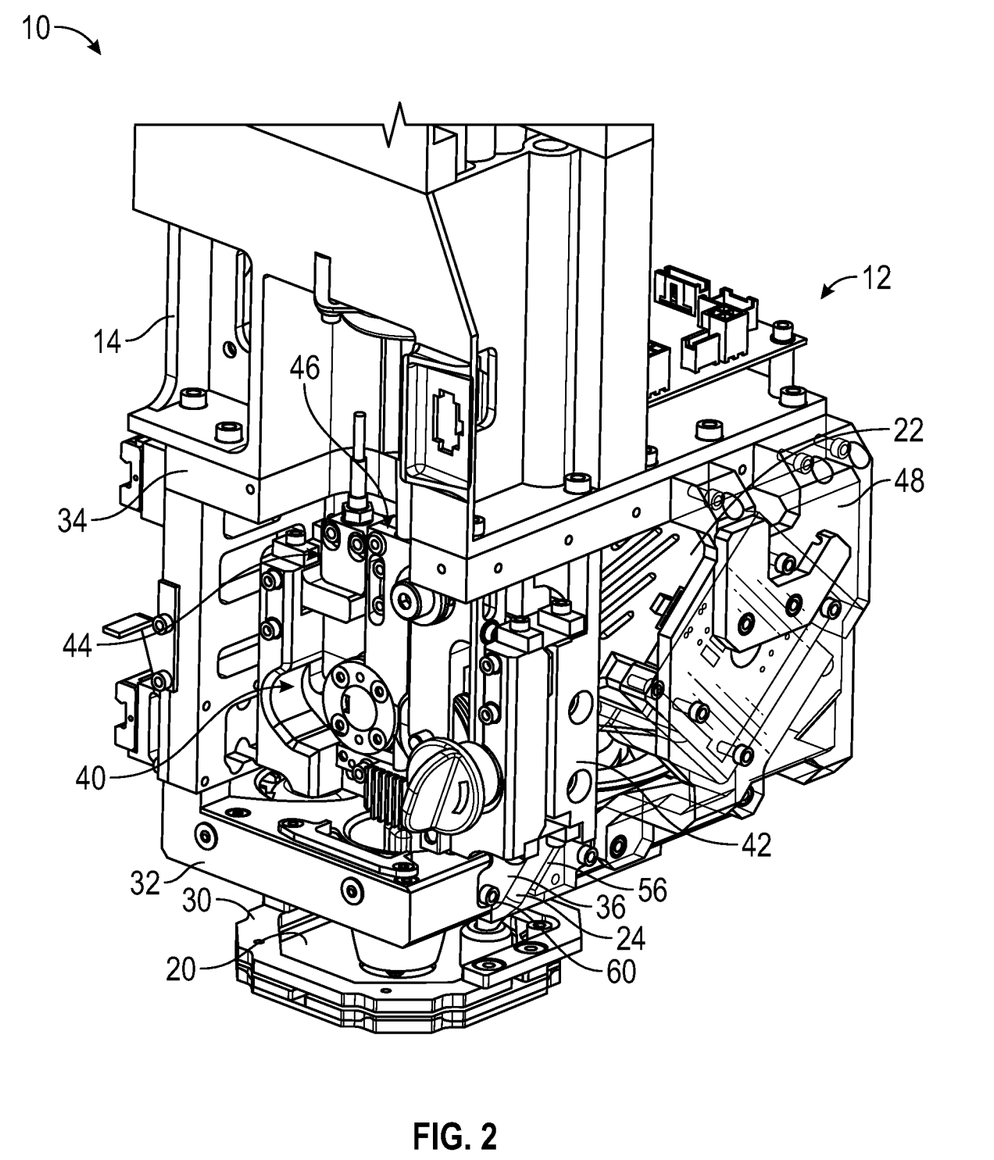
FIG. 2 is a perspective view of the printer head shown in FIG. 1 where a side bracket and a wire guide are transparent to reveal the entire transformer assembly, according to an exemplary embodiment.

FIG. 2 is an illustration of the printer head 12 shown in FIG. 1 where the wire guide 36 and the outer bracket 48 are shown in transparent line. Referring to FIGS. 1 and 2, the wire guide 36 is fixedly attached to the pan 32. In the example as shown in the figures, a plurality of mechanical fasteners 60 (seen in FIG. 1) are used to fixedly attach that wire guide 36 to the pan 32. The mechanical fasteners 60 may be, for example, nut and bolt fasteners.

Figure 3:
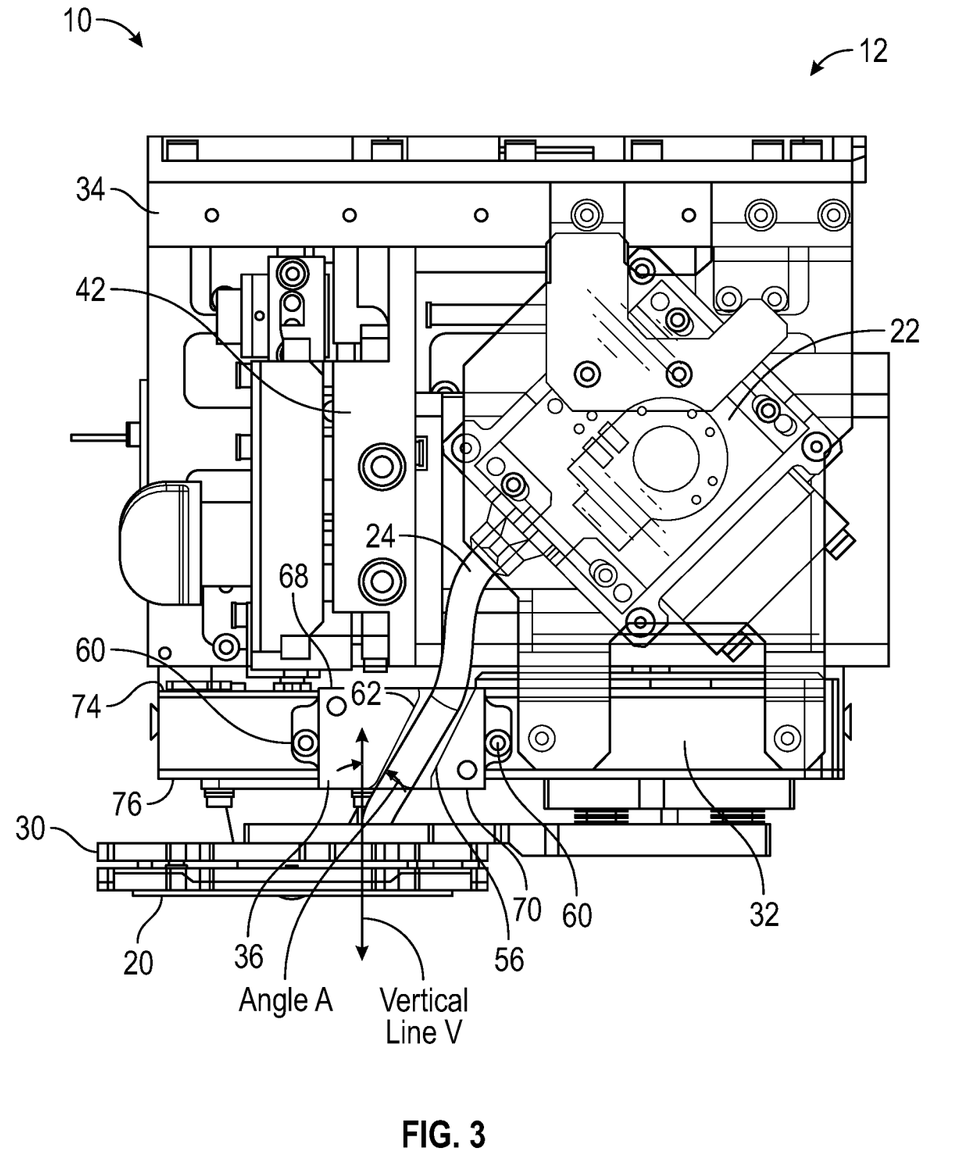
FIG. 3 is a side view of the printer head shown in FIG. 2, according to an exemplary embodiment.

FIG. 3 is a side view of the printer head 12 shown in FIG. 2, where the wire guide 36 and the outer bracket 48 are also transparent. The wire guide 36 defines an upper surface 68 and a lower surface 70. The upper surface 68 of the wire guide 36 faces the upper plate 34 and the lower surface 70 of the wire guide 36 faces the DBD disk 20. The wire guide 36 defines a passageway 56 that receives a portion 62 the electrical wire 24. Specifically, the passageway 56 extends between the upper surface 68 and the lower surface 70 of the wire guide 36. The passageway 56 of the wire guide 36 is shaped to direct the electrical wire 24 towards the DBD disk 20. The passageway 56 of the wire guide 36 is oriented at an angle A with respect to a vertical line V that is oriented straight up and down. In the example as shown, the angle A of the passageway 56 of the wire guide 36 is about thirty degrees, however, it is to be appreciated that the figures are merely exemplary in nature.

The pan 32 also defines an upper surface 74 and a lower surface 76, where the upper surface 74 of the pan 32 faces the upper plate 34 and the lower surface 70 of the pan 32 faces the DBD disk 20. The pan 32 and the wire guide 36 are parallel with respect to one another. Specifically, the upper surface 68 of the wire guide 36 is parallel with respect to the upper surface 74 of the pan 32. Similarly, the lower surface 70 of the wire guide 36 is parallel with the lower surface 76 of the pan 32. The pan 32 may be used to mount separation materials for preventing heat in the printed component from migrating to the upper part of the printer head 12.

Referring back to FIG. 1, the transformer assembly 22 is disposed between the upper plate 34 and the pan 32 of the printer head 12. Referring specifically to FIG. 1, the outer bracket 48 of the printer head 12 is attached to the upper plate 34 of the printer head 12. The transformer assembly 22 is fixedly attached to the outer bracket 48 of the printer head 12 by one or more mechanical fasteners 78.

Figure 4:
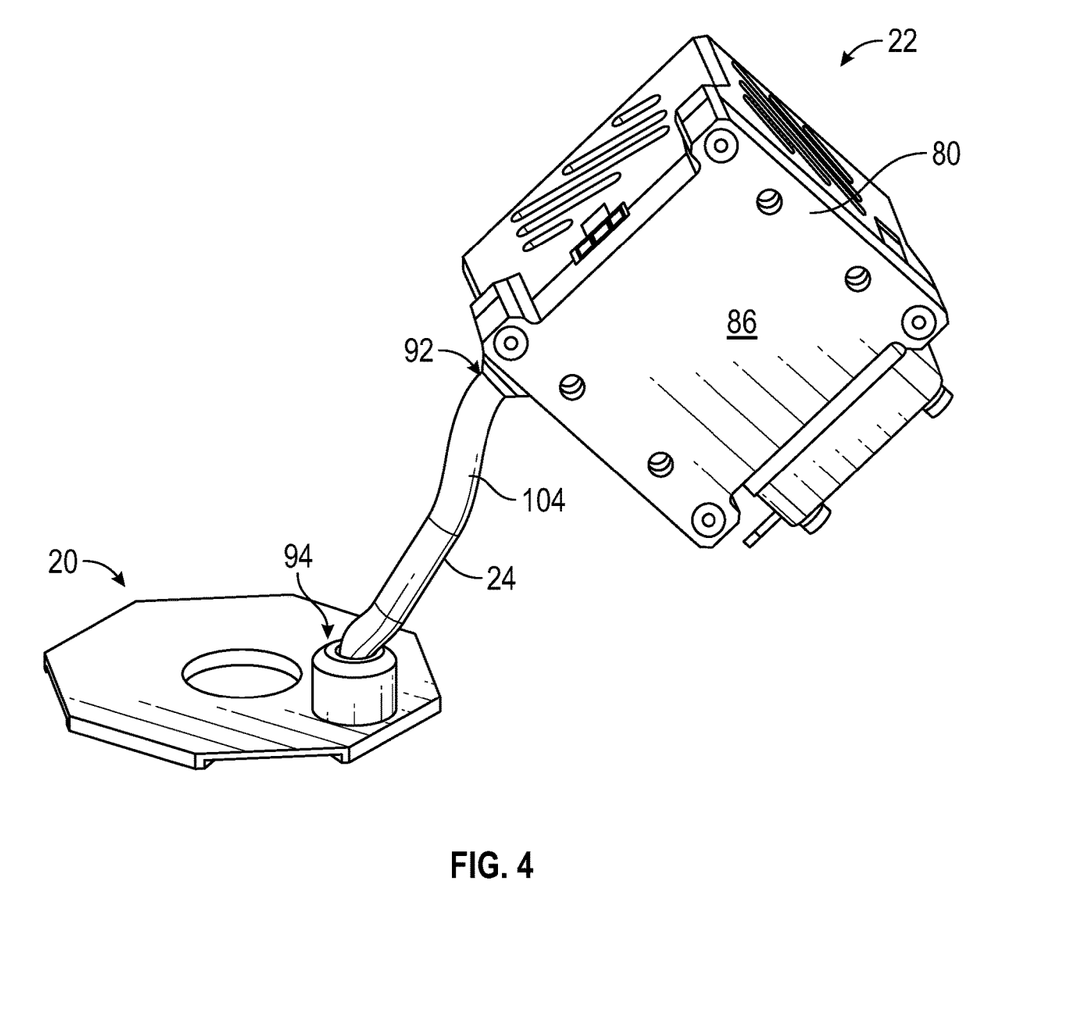
FIG. 4 is a perspective view of the transformer assembly, the DBD electrode, and an electrical wire, according to an exemplary embodiment.
Figure 5:
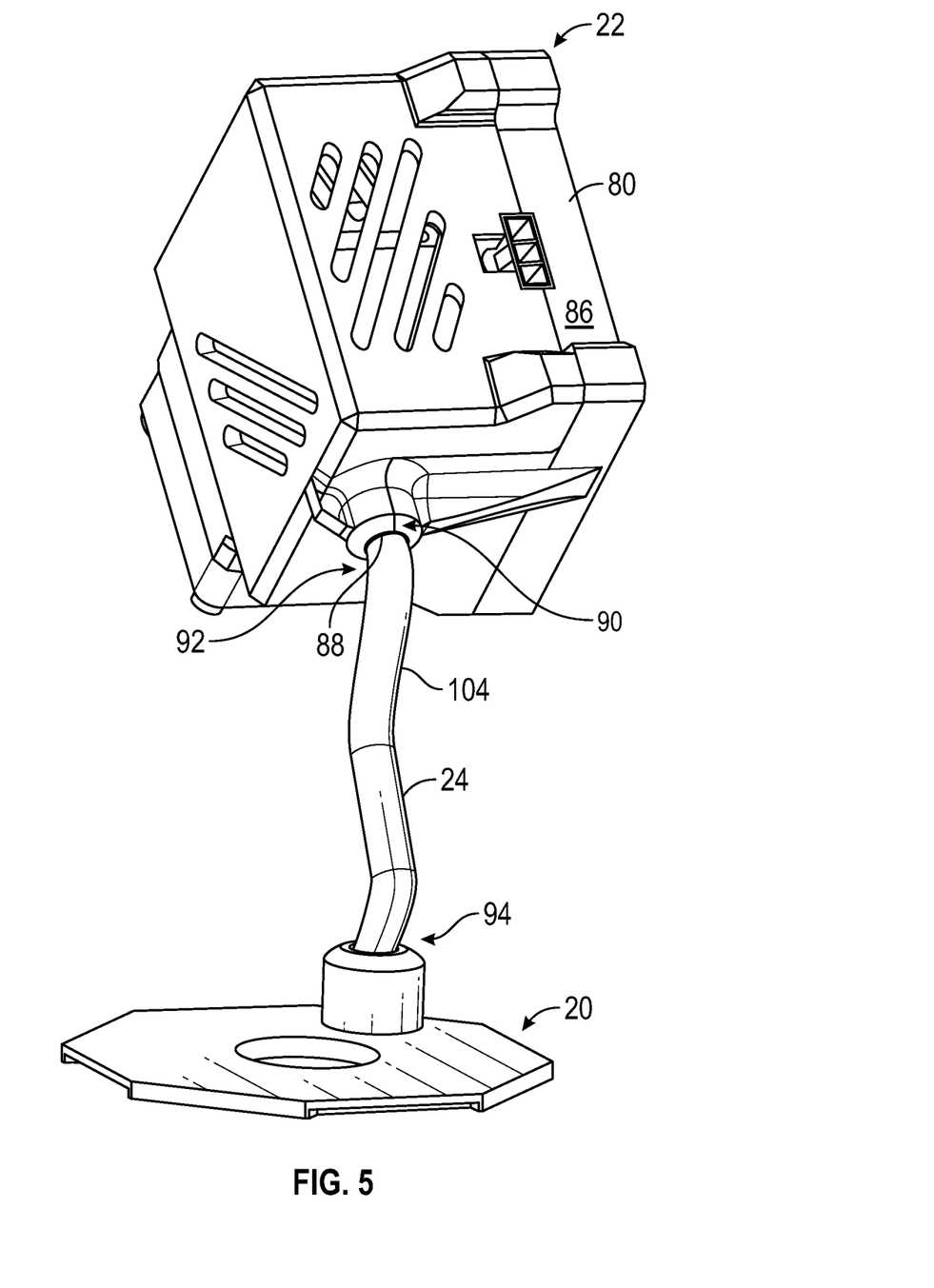
FIG. 5 is another view of the transformer assembly, the DBD electrode, and an electrical wire, according to an exemplary embodiment.
Figure 6:
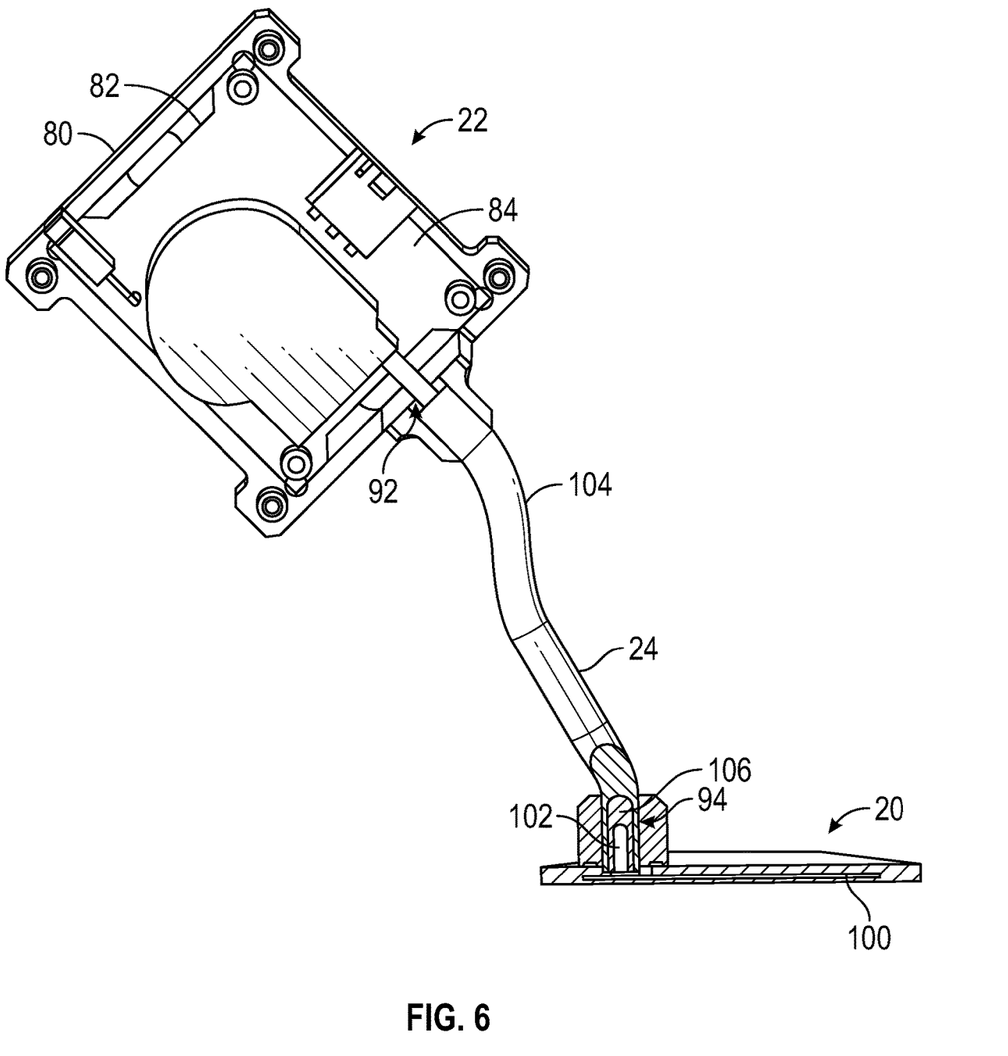
FIG. 6 is a cross-sectional view the transformer assembly, the DBD electrode, and an electrical wire, according to an exemplary embodiment.

FIG. 4 is an illustration of the DBD disk 20, the transformer assembly 22, the electrical wire 24, where the other components of the printer head 12 are omitted. FIG. 5 is another view of the DBD disk 20, the transformer assembly 22, and the electrical wire 24 shown in FIG. 4, and FIG. 6 is a cross-sectioned view of the DBD disk 20, the transformer assembly 22, and the electrical wire 24. Referring to FIGS. 4-6, the transformer assembly 22 includes a housing 80, a printed circuit board (PCB) 82 (seen in FIG. 6), and a transformer 84 (seen in FIG. 6). In embodiments, the transformer 84 is a step-up flyback transformer. The housing 80 of the transformer assembly 22 is sized to contain the PCB 82 and the transformer 84. The housing 80 is constructed of a polymer having a relatively high dielectric constant of at least about 3.5. The polymer also is also heat resistant up to about 50° C. One example of a polymer that may be used for the housing 80 is polyetherimide (PEI).

The housing 80 of the transformer assembly 22 is divided into two halves 86. Referring specifically to FIG. 5, the two halves 86 of the housing 80 meet together and define an opening 88. The opening 88 is sized to receive the electrical wire 24. In the embodiment as shown, the opening 88 is surrounded by a raised portion 90 that provides support to the electrical wire 24. The opening 88 combined with the raised portion 90 eliminates the need for an additional connector, which reduces cost and the overall complexity of the transformer assembly 22.

Figure 7:
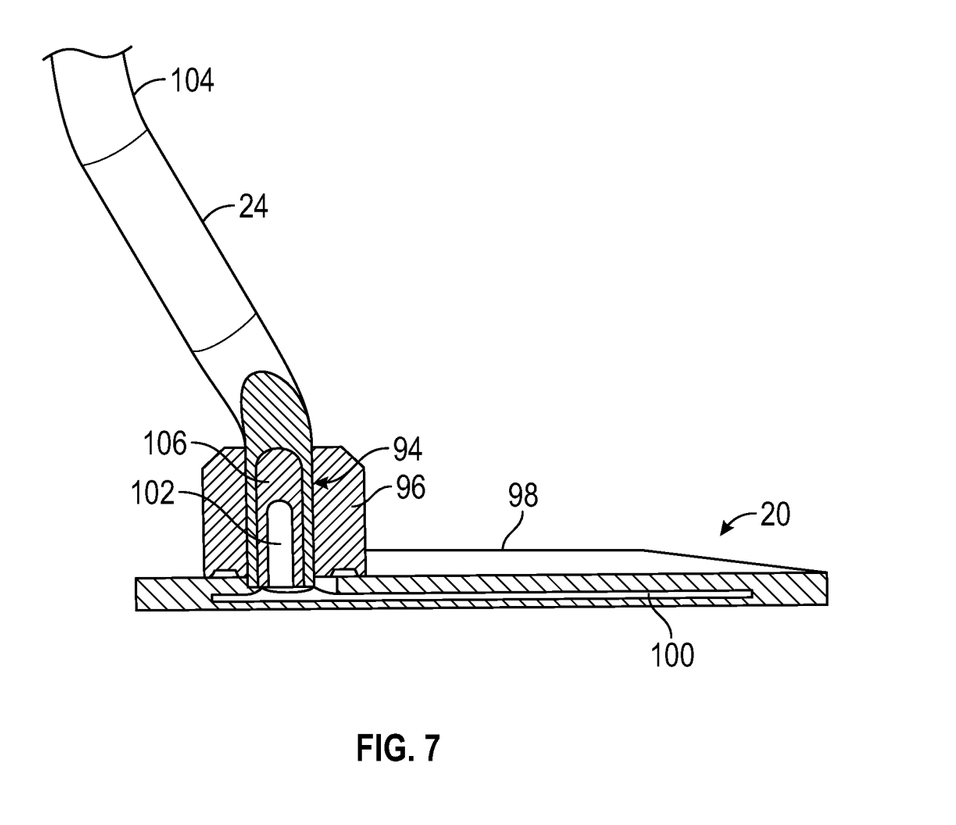
FIG. 7 is an enlarged view of the DBD disk and the electrical wire shown in FIG. 6, according to an exemplary embodiment.

The electrical wire 24 includes a first end 92 (seen in FIG. 6) electrically connected to the transformer 84 and a second end 94 (seen in FIG. 6) electrically connected to the DBD disk 20. The electrical wire 24 also includes a layer of insulation 104 that covers a conductive wire 106 (seen in FIGS. 6 and 7). Referring specifically to FIG. 6, a wire housing 96 is disposed along an upper surface 98 of the DBD disk 20. The second end 94 of the electrical wire 24 is disposed within the wire housing 96. FIG. 7 is an enlarged view of the DBD disk 20, the second end 94 of the electrical wire 24, and the wire housing 96. As seen in FIG. 7, and DBD disk 20 includes an internal conductive layer 100. The internal conductive layer 100 is constructed of conductive materials such as, for example, copper. The internal conductive layer 100 establishes a conductive plane above and parallel to the printed component 18 (FIG. 1) to allow for a uniform DBD creation. A conductive pin 102 is soldered to the internal conductive layer 100 of the DBD disk 20, where the conductive pin 102 is also constructed of conductive materials such as copper. The conductive pin 102 is then soldered to the conductive wire 106 that is covered by the layer of insulation 104 of the electrical wire 24.

Referring generally to the figures, the disclosed approach of including the transformer assembly in the printer head and the disclosed electrical connections between the transformer assembly and the DBD disk provide various technical effects and benefits. First, existing three-dimensional printers including a DBD disk have the flyback transformer positioned in a location relatively far from the printer head. As a result, relatively long electrical wiring may be needed to transmit the high voltage AC signal from the flyback transformer to the DBD disk, which results in increased cost as well as signal loss. The disclosed printer head alleviates this issue by packaging the transformer assembly within the printer head. Moreover, the electrical connection between the transformer and the DBD disk does not require any high-voltage connectors, which results in reduced cost and complexity to the three-dimensional printer.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A printer head for a three-dimensional printer, the printer head comprising:
    a dielectric barrier discharge (DBD) disk configured to generate a plasma, wherein the DBD disk requires a high voltage alternating current (AC) voltage signal to generate the plasma;
    a transformer assembly including a transformer and a housing that contains the transformer, wherein the transformer is configured to transform an incoming AC voltage signal into the high voltage AC signal for the DBD disk;
    an electrical wire that electrically connects the transformer to the DBD disk;
    a wire guide defining a passageway, wherein a portion of the electrical wire is received by the passageway in the wire guide, and wherein the passageway of the wire guide is shaped to direct the electrical wire towards the DBD disk;
    a pan, wherein the wire guide is fixedly attached to the pan;
    an upper plate that is positioned above the pan; and
    an outer bracket attached to the upper plate, wherein the transformer assembly is fixedly attached to the outer bracket by a plurality of mechanical fasteners.

2. The printer head of claim 1, wherein the transformer assembly is positioned between the upper plate and the pan.

3. The printer head of claim 1, wherein the housing of the transformer assembly is divided into two halves.

4. The printer head of claim 3, wherein the two halves of the housing meet together and define an opening sized to receive the electrical wire.

5. The printer head of claim 4, wherein the opening is surrounded by a raised portion that provides support to the electrical wire.

6. The printer head of claim 1, wherein the housing of the transformer assembly is constructed of a polymer having a dielectric constant of at least about 3.5.

7. The printer head of claim 1, wherein the housing of the transformer assembly is constructed of polyetherimide (PEI).

8. The printer head of claim 1, wherein the DBD disk includes an internal conductive layer constructed of conductive material.

9. The printer head of claim 8, further comprising a conductive pin soldered to the internal conductive layer of the DBD disk.

10. The printer head of claim 9, wherein the conductive pin is soldered to a conductive wire that is part of the electrical wire.

11. The printer head of claim 1, wherein the transformer is a step-up flyback transformer.

12. A printer head for a three-dimensional printer, the printer head comprising:
    a DBD disk configured to generate a plasma, wherein the DBD disk requires a high voltage AC signal to generate the plasma;
    a transformer assembly including a transformer and a housing that contains the transformer, wherein the transformer is configured to transform an incoming AC voltage signal into the high voltage AC signal for the DBD disk and the housing of the transformer assembly is divided into two halves;
    an electrical wire that electrically connects the transformer to the DBD disk;
    a wire guide defining a passageway, wherein a portion of the electrical wire is received by the passageway in the wire guide, and wherein the passageway of the wire guide is shaped to direct the electrical wire towards the DBD disk;
    a pan, wherein the wire guide is fixedly attached to the pan; and
    an upper plate that is positioned above the pan, wherein the transformer assembly is positioned between the upper plate and the pan.

13. The printer head of claim 12, wherein the two halves of the housing meet together and define an opening sized to receive the electrical wire.

14. The printer head of claim 12, wherein the DBD disk includes an internal conductive layer constructed of conductive material.

15. The printer head of claim 14, further comprising a conductive pin soldered to the internal conductive layer of the DBD disk, wherein the conductive pin is soldered to a conductive wire that is part of the electrical wire.

\* \* \* \* \*